United States Patent
Zhuang et al.

(10) Patent No.: US 10,997,122 B2
(45) Date of Patent: May 4, 2021

(54) FILE REDUNDANCY DETECTION AND MITIGATION

(71) Applicant: Citrix Systems, Inc., Fort Lauderdale, FL (US)

(72) Inventors: Jie Zhuang, Jiangsu (CN); Zongpeng Qiao, Jiangsu (CN); Xiao Yuan, Jiangsu (CN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 253 days.

(21) Appl. No.: 16/210,565

(22) Filed: Dec. 5, 2018

(65) Prior Publication Data

US 2020/0183887 A1 Jun. 11, 2020

(51) Int. Cl.
| | |
|---|---|
| *G06F 16/00* | (2019.01) |
| *G06F 16/174* | (2019.01) |
| *G06F 16/182* | (2019.01) |
| *G06F 16/11* | (2019.01) |
| *G06F 16/13* | (2019.01) |

(52) U.S. Cl.
CPC .......... *G06F 16/174* (2019.01); *G06F 16/122* (2019.01); *G06F 16/137* (2019.01); *G06F 16/1827* (2019.01)

(58) Field of Classification Search
None
See application file for complete search history.

(56) References Cited

U.S. PATENT DOCUMENTS

| | | | | |
|---|---|---|---|---|
| 6,547,829 B1* | 4/2003 | Meyerzon | ............. | G06F 16/951 715/234 |
| 2014/0046906 A1* | 2/2014 | Patiejunas | ............. | G06F 16/113 707/661 |

OTHER PUBLICATIONS

Microsoft Docs, Understanding Data Deduplication, printed Jan. 12, 2021, from <https://docs.microsoft.com/en-us/windows-server/storage/data-deduplication/understand#how-does-dedup-work>.
Oracle® ZFS Storage Appliance Administration Guide, Data deduplication, printed Jan. 12, 2021, <https://docs.oracle.com/cd/E51475 01/html/E52872/shares shares general data deduplication.html>.

* cited by examiner

*Primary Examiner* — Bai D Vu
(74) *Attorney, Agent, or Firm* — Banner & Witcoff, Ltd.

(57) ABSTRACT

Methods and systems for detecting and addressing file redundancies. A server may be configured to store a plurality of files associated with a plurality of identifiers. The identifiers may be generated using a hash function. The server may receive an indication of a first file. The indication of the first file may correspond to a user uploading the first file to the server, and may comprise a first identifier of the first file. The server may determine, by comparing the first identifier and the plurality of identifiers, that a second file is the same as the first file. Based on the second identifier, a pointer to the second file may be provided to prevent redundant storage of content similar to that of the second file. If an edit associated with a pointer, of a plurality of pointers to a centrally-stored file, is made, a new centrally-stored file may be created.

20 Claims, 6 Drawing Sheets

FILE REDUNDANCY DETECTION AND MITIGATION

FIELD

Aspects described herein generally relate to computers and computer networks. In particular, aspects described herein relate to file systems, operating systems, reading, writing, and storing data, storage area networks, and file redundancy.

BACKGROUND

The plentiful availability of storage space and increasing use of computing devices has made file redundancies increasingly common. For example, a user may inadvertently store two copies of the same digital photograph in different folders of cloud storage. As another example, two different users may upload copies of the same file to a server, such that the same file is stored twice, in two different locations, on the server. Such redundancies can undesirably waste storage space and data transmissions. For example, if users regularly upload the same file to a server, server bandwidth and storage space may be undesirably occupied.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations described above, and to overcome other limitations that will be apparent upon reading and understanding the present specification, aspects described herein are directed towards early detection and remediation of file redundancies. A server may receive an indication of a first file and for a first location. The indication may be, for example, a request to upload the file in a first location on a file system of the server, the file being received by the server, or the like. An identifier of the first file may be determined. For example, a one-way hash string corresponding to the first file may be received from the computing device requesting to upload the file. The identifier may be compared to other identifiers for other files stored on the server. Such files may be centrally stored on the server, such that all files presented to a user of the server are pointers to the centrally-stored files. If the identifier matches a second identifier corresponding to a second file (e.g., corresponding to a pointer in a second location in the file system), a pointer to the second file may be created in the first location. The second file may already be associated with one or more pointers, e.g., in different locations. The pointer may be created by the server or may be uploaded by the computing device. In this manner, a duplicate of the second file is not created or stored, and storage space may be preserved. The server may also reject the upload request, which may preserve bandwidth. The server may permit upload of a pointer to the second file, and/or permit the upload request of the first file, delete the first file, and replace it with a pointer to the second file. The server may be configured to detect and remediate instances in which edits to a pointer may conflict with other pointers to the same file. For example, if a server receives an edit associated with a first pointer to a centrally-stored file, and if the centrally-stored file is associated with a plurality of pointers such that an edit to the centrally-stored file would impact the other pointers, the server may create a duplicate of the file, point to the first pointer to the duplicate of the file, and implement the edit on the duplicate of the file.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards management of file redundancies in an enterprise computing system. Computing devices, such as servers, may allow users to upload and download files from a file system. As such, the same file may be uploaded twice, e.g., in two different locations, and/or by two different users. The problem of file redundancies has become particularly significant because users regularly back-up files to cloud storage. Many users configure their computing devices to regularly back up their personal files to cloud storage. While cloud storage systems often have simplistic mechanisms to ensure that only new and/or changed files are uploaded to cloud storage, such cloud storage systems lack the ability to determine whether different users are uploading the same file. For example, users that have configured their personal computers to back-up their entire hard drive may all upload multiple copies of the same dynamic-link library (DLL) file. While tools exist to check for and address redundancies, such tools are often extremely limited. For example, software tools which allow users to scan storage for redundant files exist, but such tools are slow and only serve to solve redundancies after they have occurred. Other tools have been developed to detect redundancies at a block level on a hard drive, but such tools are also slow and do not analyze files as a whole. Moreover, such tools are often ill-equipped to detect redundancies in networked environments, such as where a redundancy exists on cloud storage.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
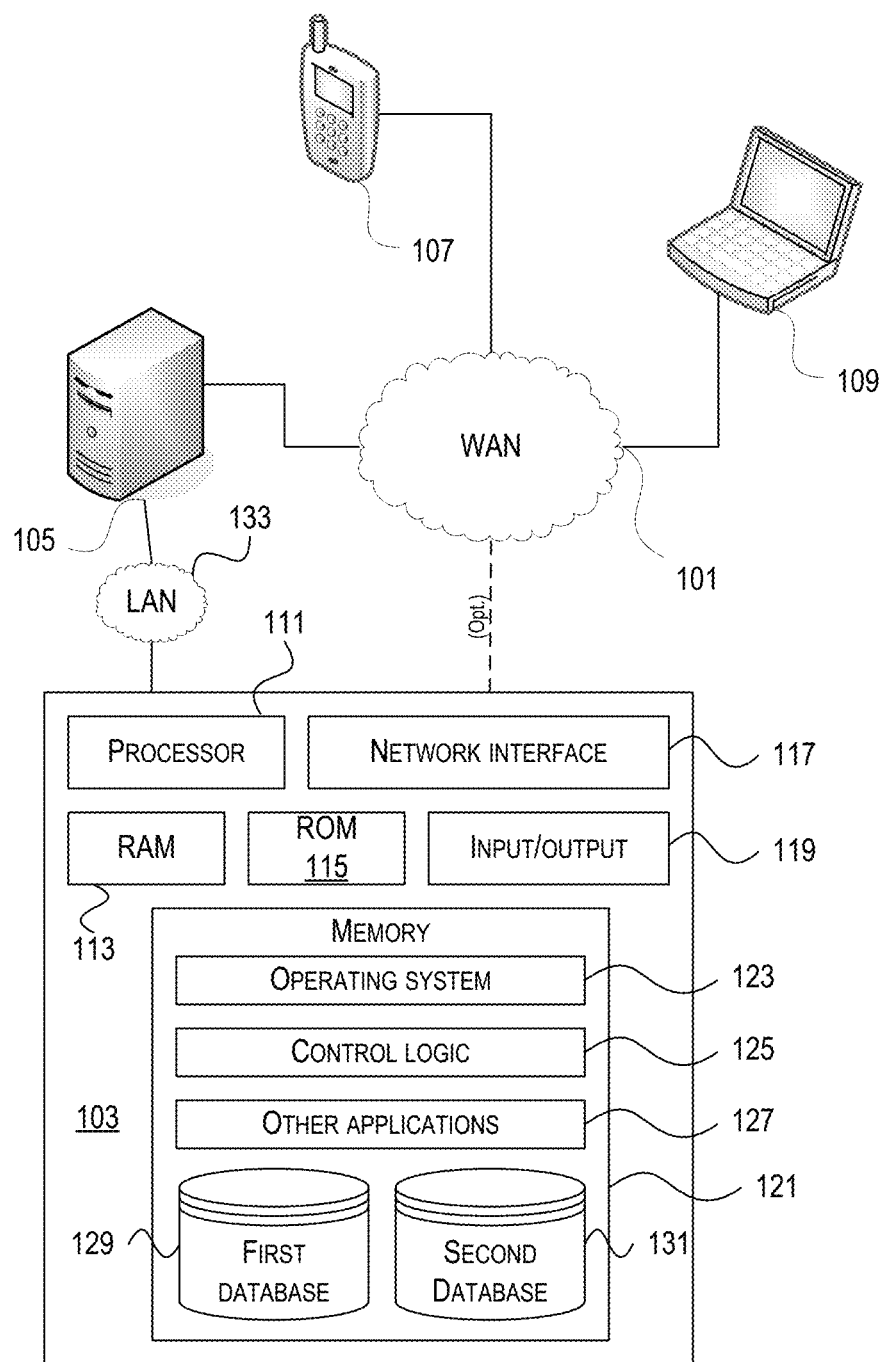
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. The wide area network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. The first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
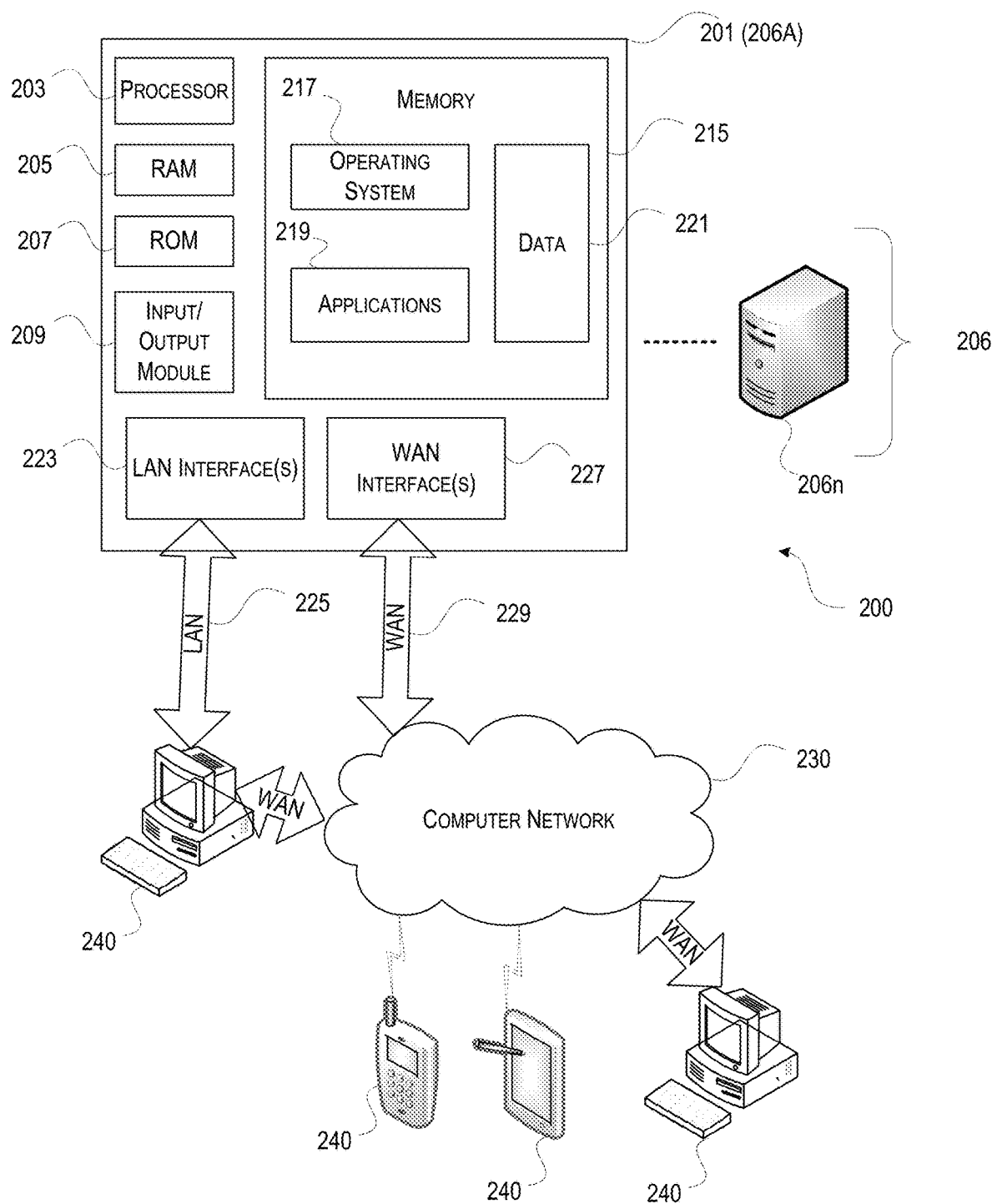
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the computing device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). The computing environment 200 may include a network appliance installed between the server(s) 206 and client machine(s) 240. The network appliance may manage client/server connections, and in some cases can load balance client connections amongst a plurality of backend servers 206.

The client machine(s) 240 may be referred to as a single client machine 240 or a single group of client machines 240, while server(s) 206 may be referred to as a single server 206 or a single group of servers 206. A single client machine 240 may communicate with one or more servers 206 and/or one or more client machines 240.

A client machine 240 may be referenced by any one of the following non-exhaustive terms: client machine(s); client(s); client computer(s); client device(s); client computing device(s); local machine; remote machine; client node(s); endpoint(s); or endpoint node(s). The server 206 may be referenced by any one of the following non-exhaustive terms: server(s), local machine; remote machine; server farm(s), or host computing device(s).

The client machine 240 may be a virtual machine. The virtual machine may be any virtual machine, and the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

The client device 240 may display application output generated by an application remotely executing on a server 206 or other remotely located machine. The client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206 may use a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 may communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. The server farm 206 may be administered as a single entity or may include multiple server farms.

A server farm may include servers 206 that execute a substantially similar type of operating system platform (e.g., WINDOWS, UNIX, LINUX, iOS, ANDROID, SYMBIAN, etc.) The server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

A first server 206a may receive requests from a client machine 240, forward the request to a second server 206b (not shown), and respond to the request generated by the client machine 240 with a response from the second server 206b (not shown). First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., the wide area network 101.

Elimination of File Redundancy

Figure 3:
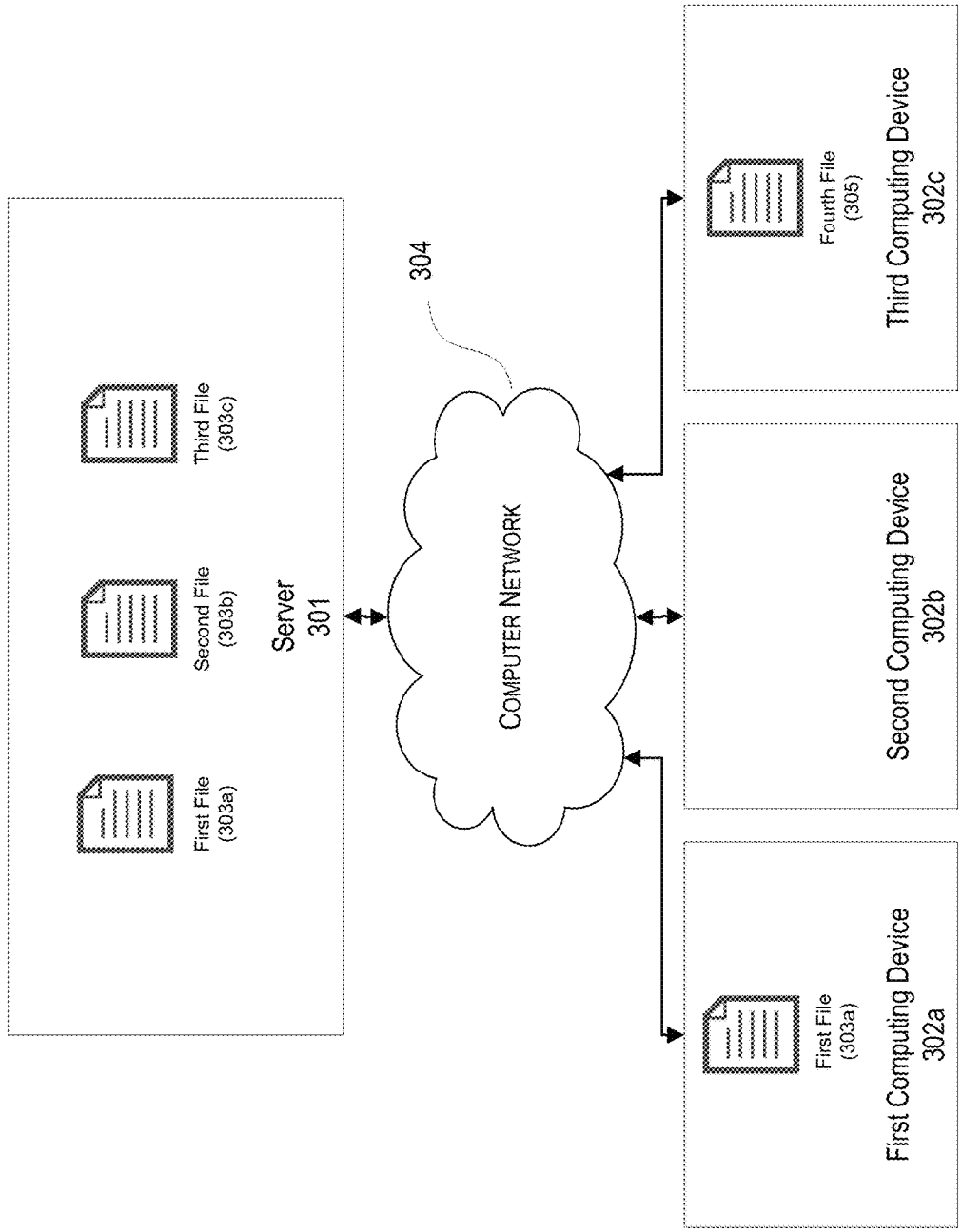
FIG. 3 depicts a file storage system which includes a server accessible by multiple computing devices via a network.

FIG. 3 depicts an illustrative network architecture with a server 301 storing files. The server 301 may be connected, via a computer network 304, to a first computing device 302a, a second computing device 302b, and a third computing device 302c. The computer network 304 may be the same or similar to the computer network 230. The server 301, first computing device 302a, second computing device 302b, and third computing device 302c may all comprise or execute on computing devices, such as the computing device 201. The server 301 may store files, e.g., on a file system executing on the server 301. Additionally or alternatively, the server 301 may cause store of files on a separate storage device, such as one of the one or more servers 206a-206n. For example, the server 301 includes a first file 303a, a second file 303b, and a third file 303c. The first computing device 302a is shown as storing first file 303a, and the third computing device 302c is shown as storing a fourth file 305.

The server 301 may be configured with a file system that, e.g., stores files such as the first file 303a. The files may be stored in accordance with any file system, such as the File Allocation Table (FAT) architecture. The files may be stored in a central repository, and all references to the files (e.g., in folders or various locations in an operating system) may be pointers to the files in the central repository. One or more locations on the file system may be shared with one or more other computing devices, and/or may be uploaded to by the one or more computing devices. For example, some files and/or locations (e.g., folders) on the server 301 may be shared (e.g., via the computer network 304) with other computing devices, such as the first computing device 302a. For example, the first file 303a may be shared with the second computing device 302b by placing the first file 303a (or a pointer to the first file 303a) in a shared folder and/or by associating the first file 303a with an indication that it is available for sharing. As another example, one or more computing devices (e.g., the first computing device 302a) may be configured to upload, to the server 301, one or more files and/or one or more pointers to a shared location. The shared location may be one or more portions of a file system, e.g., the file system on the server 301, which may be accessed by one or more users and/or one or more computing devices, such as users of the server 301, the first computing device 302a, the second computing device 302b, and/or the third computing device 302c. A file and/or pointer need not be modified or maintained in a special format in order to be shared. The server 301 may be configured to perform other operations with respect to the files and/or pointers, such as editing the files. The server 301 may store a file and/or pointer in one or more locations (e.g., folders, drives) under the same or different names File operations with respect to a file and/or pointer, such as creation of a pointer, may cause the creation of operating system file handles. Operating system file handles may be any indication, by an operating system executing with respect to a file system, that a file is being accessed by a process. For example, an operating system file handle may be created in an operating system of the server 301 when a file is read, written to, created, and/or deleted on or from the server 301.

The server 301 may additionally be configured to store pointers to stored files. A pointer may be any indication of a different location in a file system of the server 301. For example, a pointer may be configured to appear in an operating system as a separate file on the file system, but may in fact be a reference to a different file on the file system. Files may be centrally stored in the file system, and files presented to users (e.g., in an operating system) may be pointers to such centrally-stored files. Users may thereby be presented with a pointer to an original file and, if an edit is made to the pointer, the file system may be configured to duplicate the original file, point the pointer to the duplicated file, and implement the edits on the duplicated file, such that the original file is not changed. A file may be associated with a first user, and the pointer may be associated with a different user. For example, a first user may upload a photograph as a first file and create one or more pointers to the first file, a second user may upload the same photograph as a second file, and the second file may be replaced with a new pointer to the first file, even if the second user may not have adequate permissions to access the same or different files associated with the first user.

The server 301 may be configured to determine and/or store identifiers corresponding to one or more files and/or one or more pointers. The server 301 may store, for example, a table of indications of files (e.g., the name and location of a file) and corresponding identifiers of the files. An identifier may be any data, such as a hash, string, number, or the like, that corresponds to a file. For example, data of a file may be hashed using a hash function to generate a unique string of characters corresponding to the file. Such a hash may be generated using a one-way hash function. For example, a Message Digest 5 (MD5) function may be used to generate a hash corresponding to a file. Such a hash may be salted. The identifier may be associated with one or more pointers to a file such that, for example, multiple pointers to the same file may be associated with the same identifier. The identifier need not correspond to all data in a file. For example, the identifier may be for a portion of data in a file, such as a predetermined number of bits in a file. Additionally and/or alternatively, the identifier may correspond to all data in a file. For example, all bits in a file may be hashed using a one-way hash function. A count of identifiers may be maintained such that, for example, the server 301 may determine how many pointers correspond to a particular file in a file system.

Unique identifiers may be determined using a hash function. A hash function is any function which takes relatively lengthy data, such as the content of a file, and maps it to a smaller set of data, such as a string or integer. Such a function may additionally or alternatively comprise a deterministic function, such that the same input produces the same outfit. Such a function may additionally or alternatively comprise a one-way function, such that the string cannot be converted back into the content. For example, an MD5 function may convert the entirety of an arbitrary-length file into a 128-bit string which uniquely represents the content of the file. The entirety of a file may be input into a hash function, which may output an identifier of the file based on the content of the file. That identifier may uniquely identify the content of the file such that the same content may produce the exact same identifier; however, different content may produce a different identifier. Other similar algorithms may be used. For example, a hash algorithm may be determined that analyzes the bits in a file and determines, based on the bits, a unique string that uniquely represents the bits using a plurality of different hash functions. To avoid hash collision, hash functions which produce relatively longer strings may be used.

An example of how the server 301 may store identifiers corresponding to one or more files is provided below as Table 1. As shown in table 1, a file location and file name may be associated with a hash (as shown in Table 1, an MD5 hash string) of data in the file. The file location and file name may correspond to a pointer, and the identifier may correspond to a file stored in a central repository in a file system. Where two files have the same content, the files may share the same identifier (e.g., MD5 hash string).

TABLE 1

Example Identifier Table

| File Location | File Name | Identifier |
| --- | --- | --- |
| /documents/ | file.txt | 0cc175b9c0f1b6a831c399e269772661 |
| /photos/ | trip.jpg | 92eb5ffee6ae2fec3ad71c777531578f |
| /music/ | song.mp3 | 4a8a08f09d37b737956490384088b5f33 |
| /documents/ | vacation.jpg | 92eb5ffee6ae2fec3ad71c777531578f |

As may be seen in Table 1, four files are listed, and the identifier of both trip.jpg and vacation.jpg are the same. As such, except for name and location, the two files may be the same. Unnecessary storage of duplicate files, such as the storage of both trip.jpg and vacation.jpg as depicted in Table 1, may undesirably waste storage space. Also, if the duplicate file (vacation.jpg) was downloaded by the server (and/or uploaded by a computing device) when the file was already stored (as trip.jpg), bandwidth may have been wasted. For example, if both files were uploaded from a cell phone over a cellular network having a data cap, a user's data may have been undesirably wasted as a result of the upload of both files, rather than just one.

Unique identifiers may be compared. Comparison of identifiers may comprise determining whether identifiers are the same and/or similar within a threshold. For example, a hash function may be developed wherein each character of a string corresponds to a different portion of a file and, by comparing two hashes generated using this hash function, one or more portions of two different files may be determined to be different, whereas one or more second portions of the two different files may be determined to be the same.

The first computing device 302a, the second computing device 302b, and/or the third computing device 302c may be configured to upload and/or download files and/or pointers from the server 301. For example, the second computing device 302b may be configured to download, from the server 301, the second file 303b. Upload and/or download may be effectuated using an interface, such as an application executing on a computing device, a web page, or the like. Upload and/or download of a file may be effectuated by transmitting the file corresponding to the pointer.

One or more computing devices, such as the server 301, the first computing device 302a, the second computing device 302b, and/or the third computing device 302c, may be configured to transmit identifiers corresponding to files and/or pointers. For example, the server 301 may be configured to allow the first computing device 302a to upload files, and the first computing device 302a may be configured to transmit, prior to uploading a file, an identifier of the file to the server 301 to enable the server 301 to determine whether or not to allow upload of the file. Additionally or alternatively, the one or more computing devices may be configured to transmit pointers. For example, as will be discussed in greater detail below, if a first file stored by the first computing device 302a is determined to already be stored as a second file on the server 301, then the server 301 may cause the first computing device 302a to transmit a pointer to the second file, rather than transmit the first file.

The server 301 may be configured to approve or deny uploads based on the identifiers. For example, the server 301 may detect an attempt to upload, from the first computing device 302a and via the computer network 304, the first file 303a to a location on a file system of the server 301. The server 301 may determine an identifier of the first file 303a (e.g., by receiving the identifier from the first computing device or by receiving the first file 303a and using a hash function to create the identifier). The server 301 may then compare the identifier for the first file 303*a* with other stored identifiers. Based on that comparison, the server 301 may determine that the first file 303*a* is already stored on the server 301 as a second file, which may correspond to a variety of different pointers. As a result, the server 301 may take a number of different steps. The server may permit the upload of the first file 303*a*, create a new pointer to the second file in the same location as the first file 303*a*, and delete the first file 303*a*. The server may cause the first computing device 302*a* to not transmit the first file 303*a*, but instead transmit a new pointer to the second file. The server may generate a new pointer to the second file itself, rather than having the first computing device 302*a* generate and transmit the new pointer.

As yet another example, the server 301 may receive a request, from the third computing device 302*c*, to upload the fourth file 305 in a location, and the request may comprise an identifier of the fourth file 305. Based on determining that the identifier in the request corresponds to no identifiers for files as stored on the file system of the server 301, the request to upload the fourth file 305 may be approved, and the file may be transmitted from the third computing device 302*c* to the server 301. The file may be stored in a central repository of the file system, and a pointer to the centrally-stored file may be created in the location.

Figure 4:
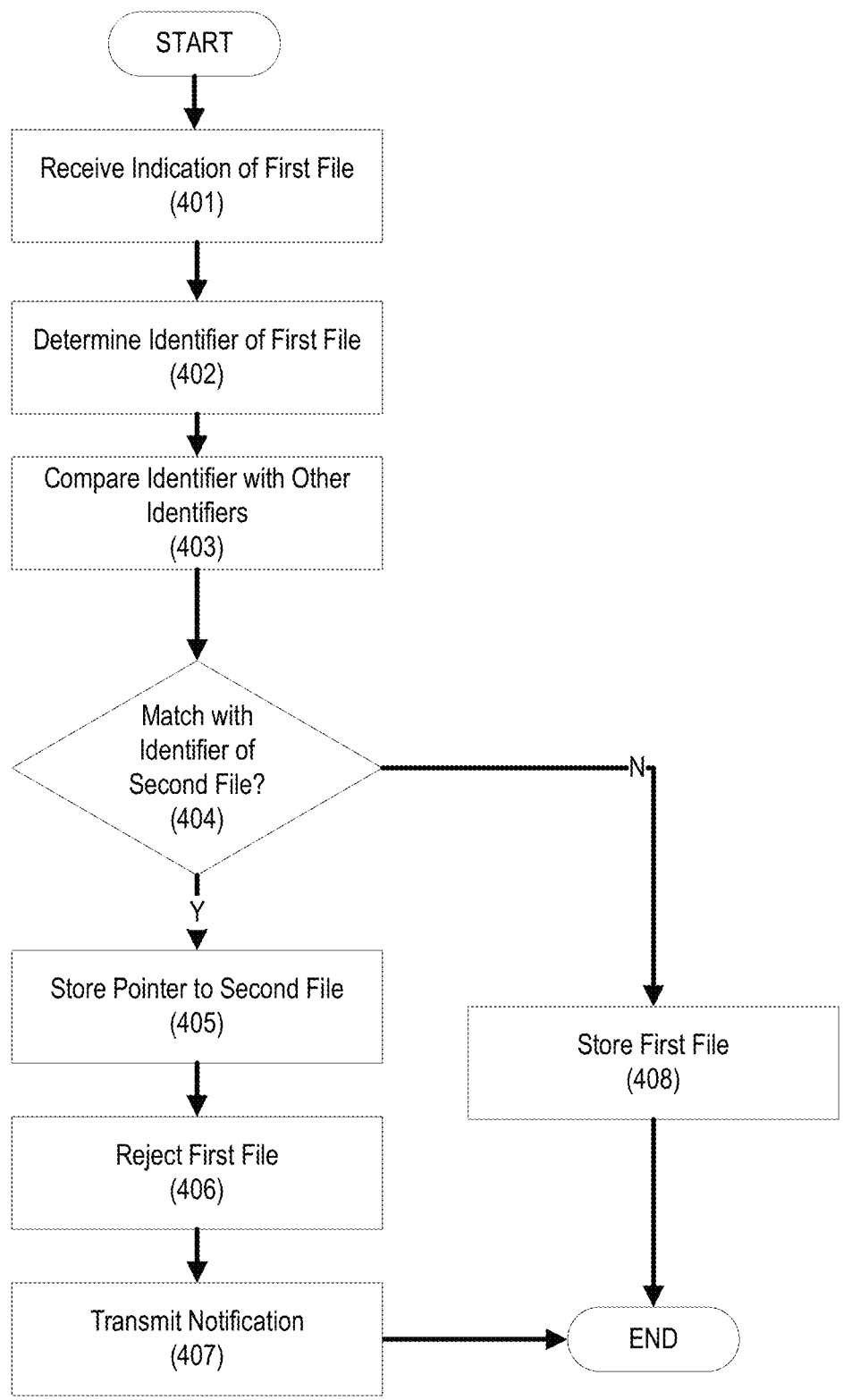
FIG. 4 is a flow chart which depicts steps which may be performed by a server of the file storage system.

FIG. 4 is a flow chart which may be performed by the server 301. In step 401, an indication of a new file may be received. Though the term new file is used herein, the file need not be newly created, and may be new merely by, e.g., being associated with an upload request. The indication may be the new file itself (e.g., such that the server 301 receives the entirety of the new file), may be a pointer to the file, and/or may be an identifier of the new file (e.g., an MD5 hash string corresponding to the new file, but not the new file itself). With regard to upload of the file, the new file may be uploaded to a particular location on a file system on, e.g., a server, such as the server 301. Additionally or alternatively, the indication may comprise an identifier of the new file, but not the new file itself. Additionally or alternatively, a pointer to a file on a file system may be received. Along with the indication of the new file, other information may be received, such as a name of the new file, a desired location of the first file, a size of the new file, or the like.

The indication may be received through a user interface enabling uploads or transfers of files. For example, the new file may be uploaded through a web site interface which enables uploads of files to the server 301. Additionally or alternatively, the indication may be received via an operating system. For example, a user may drag-and-drop, in an operating system, a file to a shared folder managed with the server 301, and this drag-and-drop action may cause an indication of a file to be transmitted to the server 301.

In step 402, an identifier of the new file is determined. The identifier may be generated based on a file. As discussed above, the identifier may be generated using a hash function configured to generate a string based on the content of a file. For example, the server 301 may be configured to generate a string corresponding to the content of a file received from another computing device. Additionally or alternatively, the identifier may be received from a different computing device, e.g., the computing device that transmitted a request to upload the new file. For example, before uploading a file and/or pointer, a computing device may be configured to use a hash function to generate a hash string corresponding to the file and transmit the hash string to the server 301. Determining the identifier may comprise executing one or more programs configured to generate the identifier. For example, a program may be configured to use one or more hash functions (e.g., the MD5 hash function) to generate a unique identifier of a file.

In step 403, the identifier of the new file is compared to other identifiers. As detailed above, the identifier may comprise a string that uniquely identifies the content of the file. As such, two files with the same content may generate the same identifier when input into the same hash function. Thus, comparing the identifier of the new file to the other identifiers may comprise searching for the identifier of the new file in the other identifiers. If a match is found (that is, if the identifier of the new file matches an identifier of a stored file), then the new file may already be stored. The other identifiers may be those stored and associated with other files on the file system. For example, the server 301 may query a database storing identifiers to determine if a match exists between the identifier of the new file and any other identifiers.

In step 404, it is determined whether a match exists. The determination that the match exists may comprise determining a stored file having a second identifier that matches with an identifier of the new file. The comparison in step 403 need not result in an exact match. For example, a plurality of identifiers may be stored for each file, each corresponding to a different portion of the file, and the comparison may require only that one of the identifiers of the plurality of identifiers match. If a match exists, the flow chart continues to step 405. If no match exists, the flow chart continues to step 407.

In step 405, based on determining that a match exists, a pointer to the stored file may be created in a location associated with the new file. Creating the pointer may comprise generating the pointer and/or receiving the pointer from another computing device. For example, if the indication of the new file corresponds to a request to upload the new file to a particular location, a pointer may be created in the particular location and to the stored file such that the new file need not be in fact uploaded. The pointer may be configured to appear as a separate copy of the new file and/or the stored file, such that a user does not know that the pointer is actually a pointer. In this manner, a new file might appear to be uploaded instantaneously, increasing the perceived speed of the system while avoiding unnecessary bandwidth use. Moreover, because the pointer may be to a file uploaded by a second user, making the pointer appear as a separate copy of the new file may be desirable to protect the privacy of the second user, such that other users cannot learn what files the second user has uploaded.

In step 406, the new file may be rejected. Rejection of the new file may comprise preventing an attempted upload of the new file, deleting the new file from a buffer and/or the file system, or the like. Rejection may comprise taking any steps to minimize transfer and/or use of the new file such that, for example, storage space and/or bandwidth is preserved.

In step 407, a notification may be transmitted. The notification may be to one or more computing devices associated with the new file, e.g., a computing device that attempted to upload the new file to the server 301. The notification may comprise, for example, an indication that the new file already exists on the file system, but that a pointer has been created. The notification may comprise information about the stored file, such as a location of the stored file, a link to the stored file, or the like. The notification may provide details on efficiencies associated with creating the pointer to the stored file, such as a transmission time saved, and/or an amount of storage space saved.

In step 408, based on determining that a match does not exist, the new file may be stored. For example, if the indication of the new file corresponds to an upload of the new file to a particular location on a file system of the server 301, then the upload may proceed, and the file may be stored at the particular location on the file system.

Figure 5:
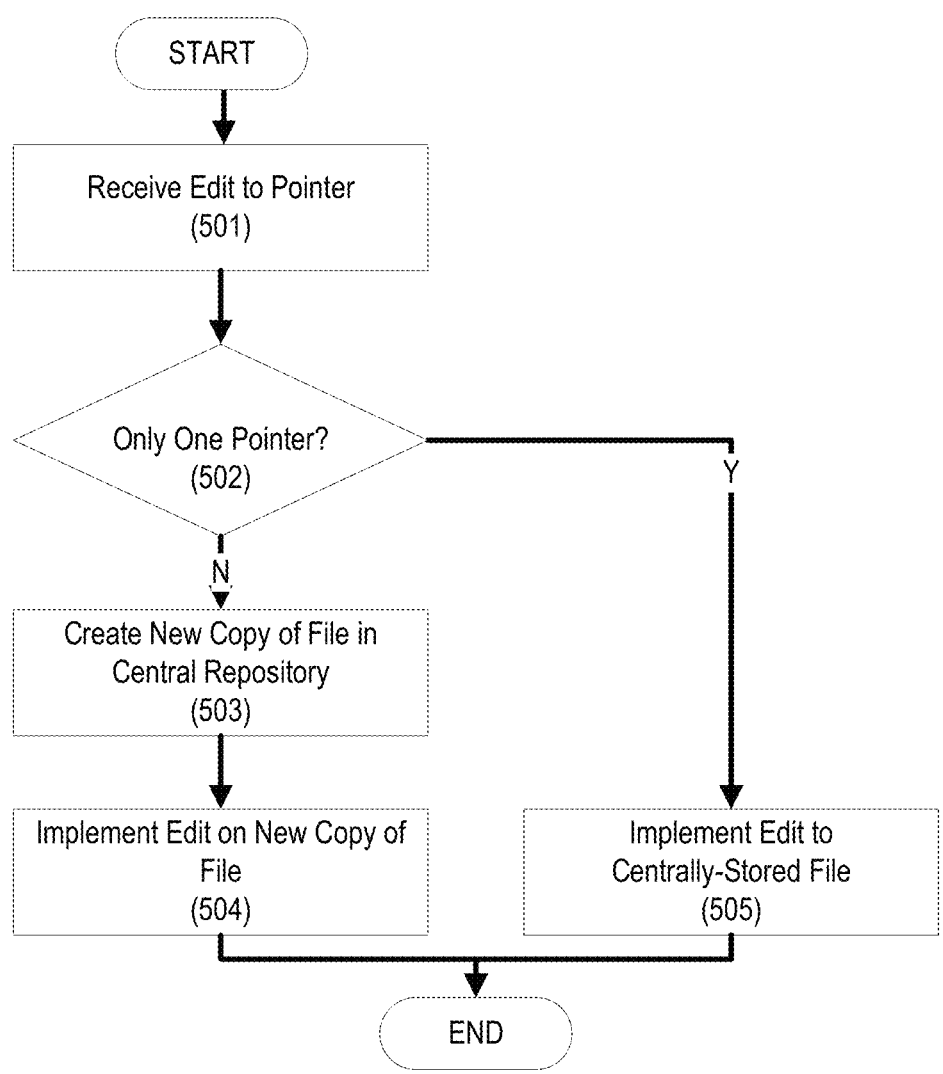
FIG. 5 is a flow chart which depicts steps which may be performed by a server of the file storage system.

FIG. 5 depicts a flow chart which may be performed by the server 301. In step 501, the server 301 may receive an edit to a pointer. The edit may be received as a request to upload a new version of the pointer, a request to execute a particular write command associated with the pointer, a request to delete all or portions of the pointer, or the like. The edit may come from software executing on the server 301 or from other computing devices, e.g., the first computing device 302a.

In step 502, it is determined whether the stored file is the only pointer to a particular file. A file system may be configured to store files in a central repository, with all files presented to a user being pointers to files in the central repository. As such, a centrally-stored file may be associated with a plurality of different pointers. The file system may store such pointers as a particular file type, file extension, and/or otherwise tag a pointer as a pointer such that it may be identified when desired. As pointers may be presented to users as if they are a separate file, a user may attempt to edit (e.g., add content to) a pointer as if it were a separate file as compared to other pointers to the same file. For example, software executing on the user's computing device may store a cached copy of a file, make edits to the file, and attempt to save the edits to the pointer by transmitting the file to the same location and with the same name as the pointer. If the pointer is the only pointer to the centrally-stored file, the flow chart proceeds to step 505. If the pointer is one of a plurality of pointers to the same file, the flow chart proceeds to step 503.

In step 503, if the pointer is one of a plurality of pointers to the same centrally-stored file, a new copy of the file may be created in the central repository, and the pointer may be pointed to the new copy of the file. No change may be perceived by the user. For example, the new copy of the file may have the same identifier as the original copy, the pointer may have the same name, and the like.

In step 504, the edits may be implemented on the new copy of the file. By implementing the edits on the new copy of the file, the file to which the pointer formerly pointed is kept the same, whereas the new copy is edited, and the pointer now points to the edited new copy. Because the edit may thereby change the new copy of the file, a new identifier may be generated for the new copy of the file, and the new identifier may be stored as associated with the new copy of the file. As the content may be changed in the new copy of the file, the identifier of the new copy and the identifier of the original copy may be different. In this manner, the file system may be configured to maintain a current list of identifiers for all files stored by the file system.

Figure 6A:
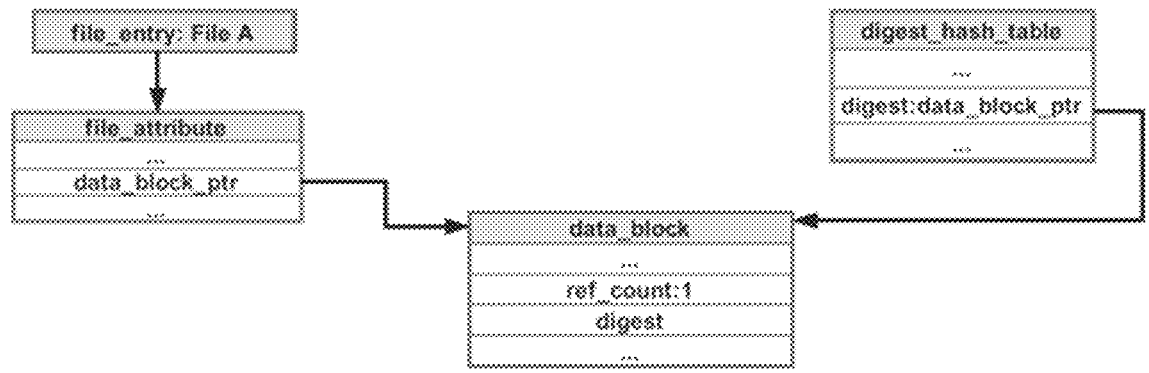
FIG. 6a depicts an exemplary file structure of a file system with one file.

FIG. 6a depicts an exemplary file structure of a file system which may exist on the server 301. The file system in FIG. 6a particularly depicts how a central repository may store file data, with all files presented to a user being pointers to that centrally-stored data. A first file (File A) may be associated with a series of attributes as stored in a file attribute table (file_attribute), and the file attribute table may store an identifier (data_block_ptr) for the file. Such attributes may comprise, for example, a file size, file modification time, file name, file extension, default application used to open the file, and/or the like. The identifier may correspond and/or reference to the actual data of the file, as stored in a data block table (data_block). The data block table may maintain a count of a number of files referencing particular data in the data block table (ref_count:1). A listing of identifiers may be maintained in an identifier table (digest_hash_table), and each identifier may refer back to the data block table (data_block). As may be seen in FIG. 6a, the same centrally-stored file data (in data_block) may be referenced by multiple pointers (e.g., those reflected by file_entry: File A and file_entry: file B) in different locations and with different attributes.

Figure 6B:
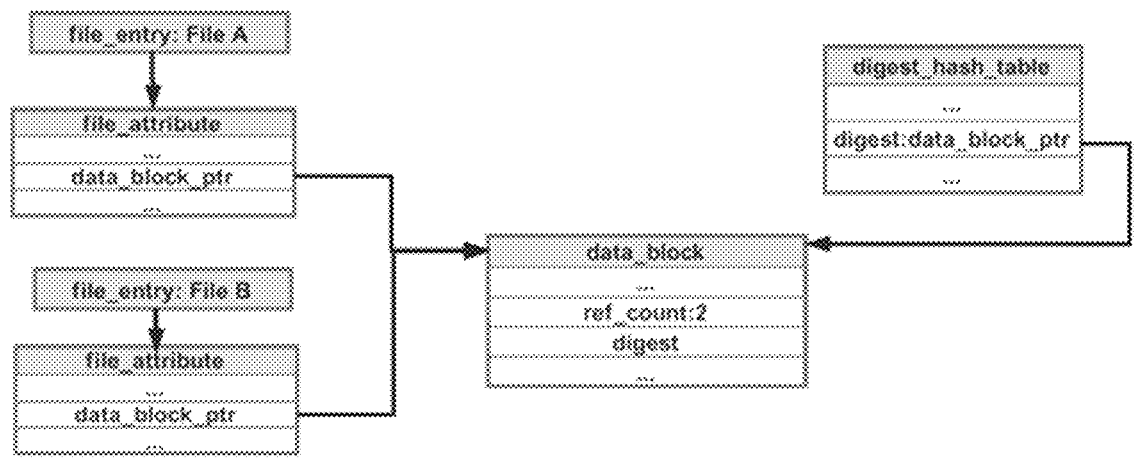
FIG. 6b depicts an exemplary file structure of a file system with two files corresponding to the same file data.

FIG. 6b is similar to FIG. 6a, and a second file (File B) has been added with the same identifier (data_block_ptr) as the first file (File A). As shown in FIG. 6b, the count of the number of files referencing particular data in the data block table has been incremented (ref_count:2). As shown in FIG. 6a and FIG. 6b, the file system may treat files as pointers to a centrally-managed block of data, and may track how many pointers to the centrally-managed block of data exist.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    receiving, by a computing device, a request to store a first file in a first location on a file system of the computing device;
    determining, by the computing device, a first identifier corresponding to the first file, wherein the first identifier is generated using a one-way hash function;
    comparing, by the computing device, the first identifier with a second identifier to determine that the first identifier is the same as the second identifier, wherein the second identifier corresponds to a second file already stored in a second location on the file system; and
    preventing, by the computing device, redundant storage of content similar to that of the second file within the file system of the computing device by providing, by the computing device and based on the comparison of the first identifier with the second identifier, a pointer to the second file instead of storing the first file.

2. The method of claim 1, wherein the file system is configured to provide the pointer to the second file as a separate copy of the first file.

3. The method of claim 1, wherein the request to store the first file is initiated by an attempt, by a second computing device, to upload the first file to the computing device.

4. The method of claim 3, wherein determining the first identifier comprises:
    receiving, from the second computing device, the first identifier.

5. The method of claim 1, further comprising:
    receiving an edit associated with the pointer to the second file;
    creating, by the computing device and at a location corresponding to the pointer, a separate copy of the second file; and
    implementing the edit on the separate copy of the second file.

6. The method of claim 1, wherein receiving the request to store the first file comprises:

detecting, by the computing device, an operating system file handle that indicates creation of the first file.

7. The method of claim 1, wherein the first identifier is generated by using the one-way hash function to generate a string based on the content of the first file.

8. One or more non-transitory computer-readable storage media having computer-executable instructions stored thereon that, when executed, cause:
- receiving, by a computing device, a request to store a first file in a first location on a file system of the computing device;
- determining, by the computing device, a first identifier corresponding to the first file, wherein the first identifier is generated using a one-way hash function;
- comparing, by the computing device, the first identifier with a second identifier to determine that the first identifier is the same as the second identifier, wherein the second identifier corresponds to a second file already stored in a second location on the file system; and
- preventing, by the computing device, redundant storage of content similar to that of the second file within the file system of the computing device by providing, by the computing device and based on the comparison of the first identifier with the second identifier, a pointer to the second file instead of storing the first file.

9. The computer-readable storage media of claim 8, wherein the file system is configured to provide the pointer to the second file as a separate copy of the first file.

10. The computer-readable storage media of claim 8, wherein the request to store the first file is initiated by an attempt, by a second computing device, to upload the first file to the computing device.

11. The computer-readable storage media of claim 10, wherein the instructions, when executed, cause the determining the first identifier by causing the computing device to receive the first identifier from the second computing device.

12. The computer-readable storage media of claim 8, wherein the instructions, when executed, further cause:
- receiving, by the computing device, an edit associated with the pointer to the second file;
- creating, by the computing device and at a location corresponding to the pointer, a separate copy of the second file; and
- implementing, by the computing device, the edit on the separate copy of the second file.

13. The computer-readable storage media of claim 8, wherein the instructions, when executed, cause the receiving the request to store the first file by causing the computing device to detect an operating system file handle that indicates creation of the first file.

14. The computer-readable storage media of claim 8, wherein the instructions, when executed, cause the determining the first identifier by using the one-way hash function to generate a string based on the content of the first file.

15. A system comprising:
- a computing device; and
- a server;
- wherein the computing device is configured to:
  - transmit, to the server, a request to upload a first file to a first location on a file system of the server; and
- wherein the server is configured to:
  - store a plurality of identifiers corresponding to a plurality of files stored on the file system;
  - determine a duplicate of the first file based a second identifier; of the plurality of identifiers; that corresponds to a first identifier of the first file, the duplicate being already stored on the file system of the server, the second identifier further corresponding to a second file in a second location on the file system, and the first identifier and the second identifier being generated, by the server, using a one-way hash function;
  - prevent upload of the first file; and
  - prevent redundant storage of content similar to that of the second file within the file system of the computing device by providing, in the first location on the file system, a pointer to the second file.

16. The system of claim 15, wherein the file system is configured to provide the pointer to the second file as a separate copy of the first file.

17. The system of claim 15, wherein the request comprises the first identifier.

18. The system of claim 15, wherein the server is further configured to:
- receive an edit associated with the pointer to the second file;
- create, at a location corresponding to the pointer, a separate copy of the second file; and
- implement the edit on the separate copy of the second file.

19. The system of claim 15, wherein the server is further configured to:
- transmit, to the computing device, a notification that the first file already exists on the file system.

20. The system of claim 19, wherein the notification comprises a link to the second file.

* * * * *